(12) United States Patent
Kake et al.

(10) Patent No.: US 11,250,592 B2
(45) Date of Patent: Feb. 15, 2022

(54) INFORMATION PROCESSING APPARATUS

(71) Applicant: SONY INTERACTIVE ENTERTAINMENT INC., Tokyo (JP)

(72) Inventors: Tomokazu Kake, Tokyo (JP); Satoshi Nakajima, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 29 days.

(21) Appl. No.: 16/955,721

(22) PCT Filed: Jan. 30, 2018

(86) PCT No.: PCT/JP2018/002971
§ 371 (c)(1),
(2) Date: Jun. 18, 2020

(87) PCT Pub. No.: WO2019/150431
PCT Pub. Date: Aug. 8, 2019

(65) Prior Publication Data
US 2021/0012529 A1 Jan. 14, 2021

(51) Int. Cl.
*G06T 7/73* (2017.01)
*G06F 3/01* (2006.01)
*G06K 9/00* (2006.01)

(52) U.S. Cl.
CPC ............... *G06T 7/75* (2017.01); *G06F 3/013* (2013.01); *G06K 9/00369* (2013.01); *G06K 9/00375* (2013.01)

(58) Field of Classification Search
CPC ....... G06T 19/006; G06T 19/20; G06T 17/00; G06T 19/00; G06T 2207/30196;
(Continued)

(56) References Cited

U.S. PATENT DOCUMENTS 10,943,409 B2 * 3/2021 Ishihara .................. G06F 3/14
2010/0091096 A1 * 4/2010 Oikawa .................. G09G 5/377
348/53

(Continued)

FOREIGN PATENT DOCUMENTS

JP 2013-020578 A 1/2013
JP 2017-182274 A 10/2017
(Continued)

OTHER PUBLICATIONS

Joint Attention by Gaze Interpolation and Saliency (Year: 2013).*
(Continued)

*Primary Examiner* — Nizar N Sivji
(74) *Attorney, Agent, or Firm* — Katten Muchin Rosenman LLP

(57) ABSTRACT

An information processing apparatus acquires, in regard to a subject in a three-dimensional space, unit element information including information regarding a position, in the space, of each of plural unit elements configuring the subject, draws a space image indicative of a state of a virtual space in which the plural unit elements are arranged using the unit element information, and specifies a posture of the subject in the three-dimensional space on the basis of a result obtained by executing a posture estimation process targeting a two-dimensional image for the drawn space image.

11 Claims, 6 Drawing Sheets

(58) Field of Classification Search
CPC . G06T 2207/30204; G06T 2207/30244; G06T 11/20; G06T 11/203; G06T 2200/04; G06T 2207/30201; G06T 7/75; G06T 7/70; G06F 3/011; G06F 3/017; G06F 3/0346; G06F 1/163; G06F 3/04815; G06F 3/01; G06F 3/013; G06F 3/0304; G06K 9/4628; G06K 9/00201; G06K 9/00389; G06K 9/00604; G06K 9/3216; G06K 9/00275; G06K 9/00355; G06K 9/00369; G06K 9/00342; G06K 2209/40; G06K 9/00335; G06K 9/00375

See application file for complete search history.

(56) References Cited

U.S. PATENT DOCUMENTS

| | | | | |
|---|---|---|---|---|
| 2012/0039507 | A1* | 2/2012 | Ikenoue | G06K 9/00362 382/103 |
| 2014/0168268 | A1* | 6/2014 | Oi | G01C 21/3647 345/633 |
| 2015/0016680 | A1* | 1/2015 | Mack | G06T 19/006 382/103 |
| 2015/0379772 | A1* | 12/2015 | Hoffman | G06T 19/006 345/633 |

FOREIGN PATENT DOCUMENTS

| | | | | |
|---|---|---|---|---|
| WO | WO-2010130245 | A1 * | 11/2010 | G06T 7/75 |
| WO | WO-2012106070 | A2 * | 8/2012 | G06T 7/20 |

OTHER PUBLICATIONS

Human Body 3D Posture Estimation Using Significant Points and Two Cameras (Year: 2014).*

Live Three-Dimensional Content for Augmented Reality (Year: 2005).*

International Prelimnary Report on Patentability dated Aug. 13, 2020, from International Application No. PCT/JP2018/002971, 11 sheets.

International Search Report and Written Opinion dated Apr. 10, 2018, from International Application No. PCT/JP2018/002971, 7 sheets.

Sagawa, Yuichi, Shimosaka, Masamichi, Mori, Taketoshi, Sato, Tomomasa, Fast Online Human Pose Estimation via 3D Voxel Data, Journal of the Robotics Society of Japan, Dec. 15, 2008, vol. 26. No. 8 , pp. 55-56.

* cited by examiner (a)

(b)

(c)

INFORMATION PROCESSING APPARATUS

TECHNICAL FIELD

The present invention relates to an information processing apparatus, an information processing method, and a program for specifying the posture of an object in a three-dimensional space.

BACKGROUND ART

A technology which constructs a three-dimensional virtual space and presents a state of the inside of the three-dimensional virtual space to a user is known. In such a technology as just described, an object in the virtual space is represented by a set of face elements such as a polygon mesh. Alternatively, volume elements called voxels or a point cloud are sometimes stacked in a virtual space to represent an object in a virtual space. Further, there is known a sensor technology by which, in order to reproduce an object such as a person existing in the real space in a virtual space, for each of unit elements such as face elements or volume elements configuring the surface of the object in the real space, the position of the unit element in the real space is specified.

SUMMARY

Technical Problem

In the case where processing such as an interaction between objects in a virtual space is to be performed, it is sometimes desired to specify the posture of the objects. For example, in the case where an object representing the body of a person is to be arranged in a virtual space, it is sometimes desired to know the individual positions of the head, body, legs, and so forth of the person or the pose the person is taking. However, in the case where the object is represented by a set of unit elements such as face elements or volume elements, it is not always easy to specify an overall shape or a posture of the object from position information regarding individual unit elements of the object.

The present invention has been made taking the above-described actual circumstances into consideration, and one of objects of the present invention resides in the provision of an information processing apparatus, an information processing method, and a program by which a posture of an object can be specified effectively using information regarding unit elements configuring the object.

Solution to Problem

An information processing apparatus according to the present invention includes a unit element information acquisition unit configured to acquire, in regard to a subject in a three-dimensional space, unit element information including information regarding a position, in the space, of each of plural unit elements configuring the subject, a space image drawing unit configured to draw a space image indicative of a state of a virtual space in which the plural unit elements are arranged, using the unit element information, and a posture specification unit configured to specify a posture of the subject in the three-dimensional space on the basis of a result obtained by executing a posture estimation process targeting a two-dimensional image for the drawn space image.

An information processing method according to the present invention includes a step of acquiring, in regard to a subject in a three-dimensional space, unit element information including information regarding a position, in the space, of each of plural unit elements configuring the subject, a step of drawing a space image indicative of a state of a virtual space in which the plural unit elements are arranged, using the unit element information, and a step of specifying a posture of the subject in the three-dimensional space on the basis of a result obtained by executing a posture estimation process targeting a two-dimensional image for the drawn space image.

A program according to the present invention is a program for causing a computer to execute a step of acquiring, in regard to a subject in a three-dimensional space, unit element information including information regarding a position, in the space, of each of plural unit elements configuring the subject, a step of drawing a space image indicative of a state of a virtual space in which the plural unit elements are arranged using the unit element information, and a step of specifying a posture of the subject in the three-dimensional space on the basis of a result obtained by executing a posture estimation process targeting a two-dimensional image for the drawn space image. Such program may be stored in and provided as a computer-readable non-transitory information storage medium.

DESCRIPTION OF EMBODIMENT

In the following, an embodiment of the present invention is described in detail with reference to the drawings.

Figure 1:
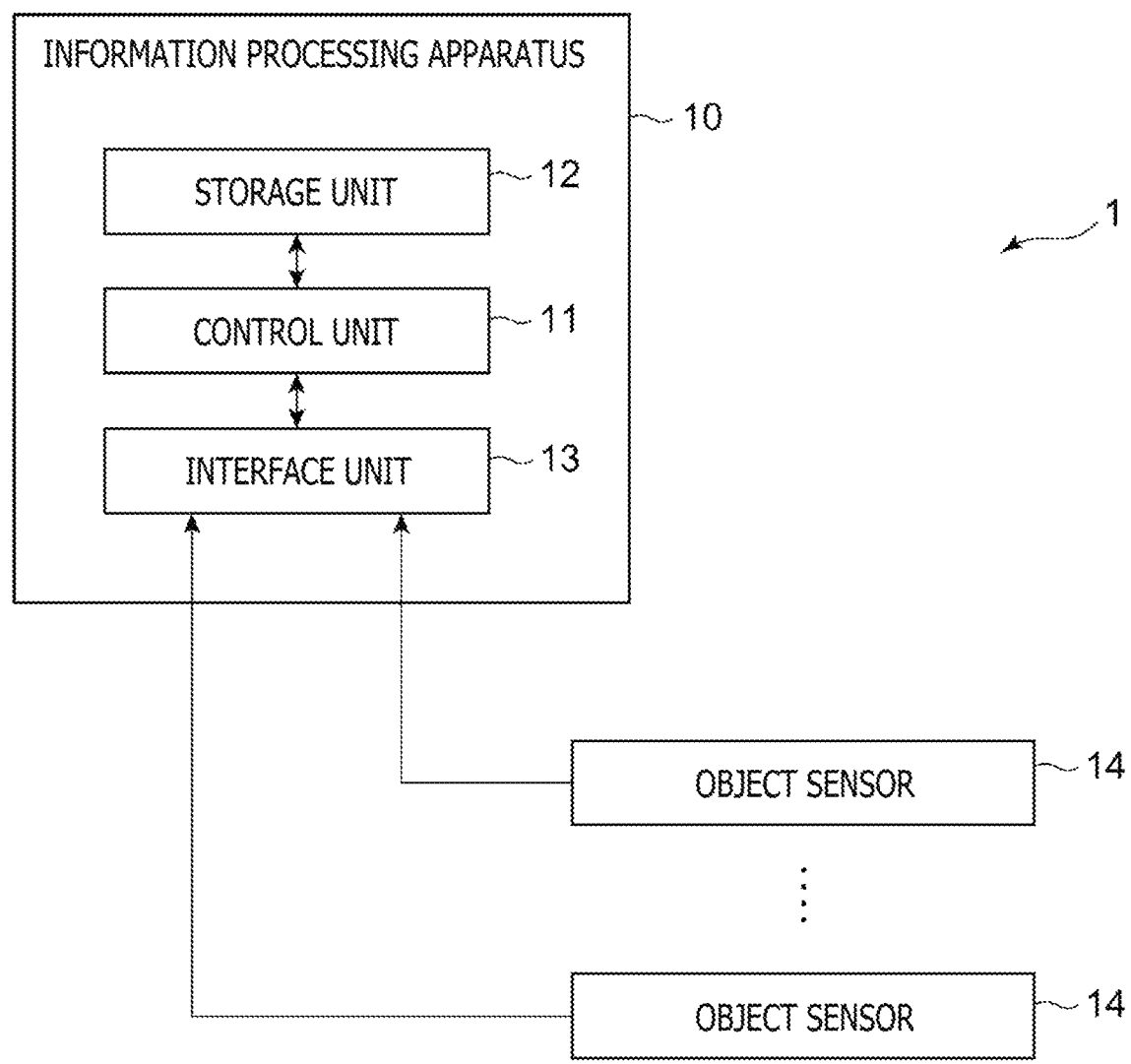
FIG. 1 is an overview diagram of an information processing system including an information processing apparatus according to an embodiment of the present invention.
Figure 2:
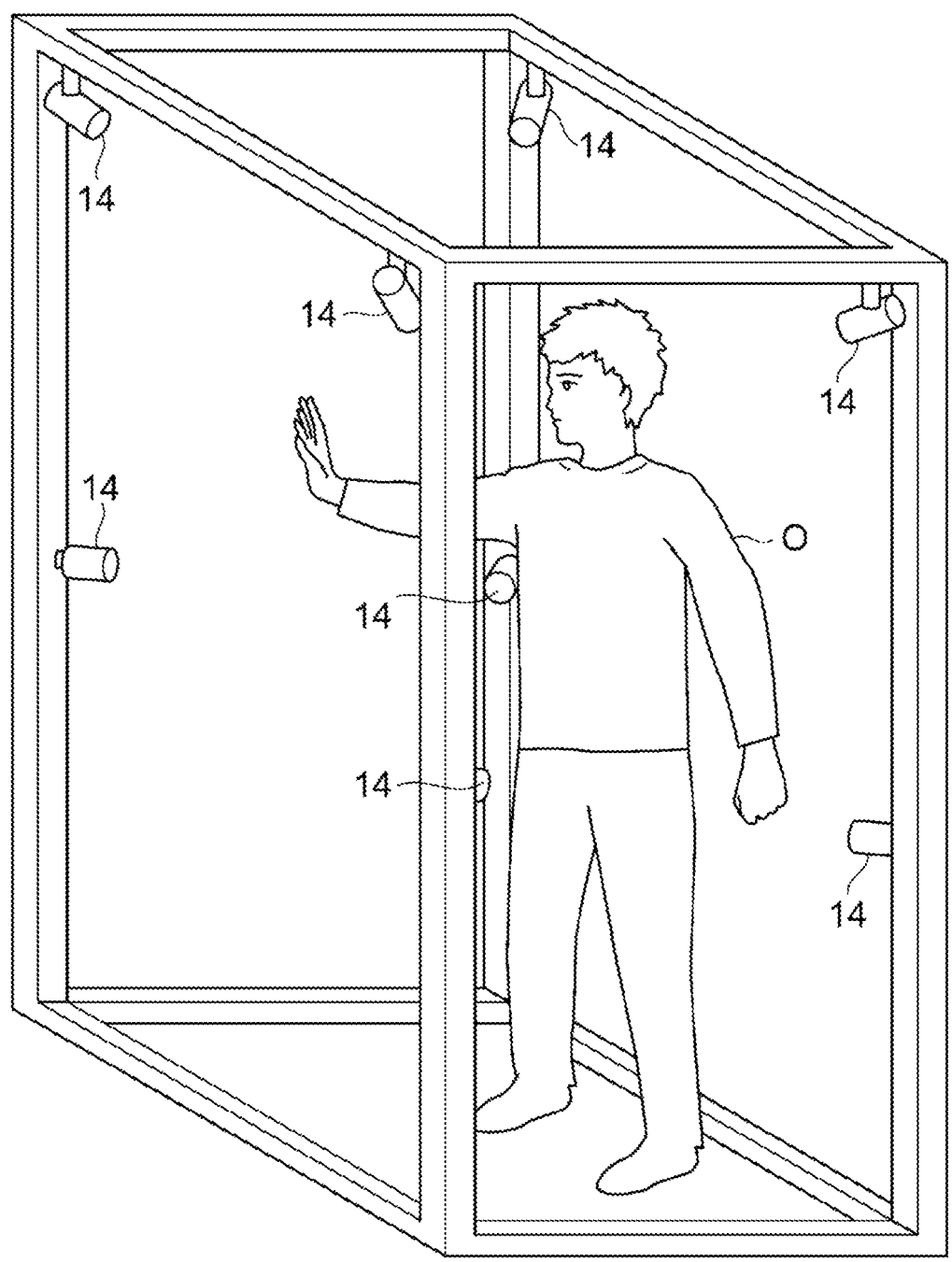
FIG. 2 is a view depicting a state of a user who uses the information processing system.

FIG. 1 is a configuration block diagram depicting an overall configuration of an information processing system 1 including an information processing apparatus according to an embodiment of the present invention. Meanwhile, FIG. 2 is a view depicting a state of a user who uses the information processing system 1. The information processing system 1 constructs a virtual space in which an object representative of the body of a user is arranged.

As depicted in FIG. 1, the information processing system 1 is configured including an information processing apparatus 10 and one or more object sensors 14. The information processing apparatus 10 is an information processing apparatus such as a personal computer or a home-use game machine and is configured including a control unit 11, a storage unit 12, and an interface unit 13.

The control unit 11 is configured including at least one processor and executes a program stored in the storage unit 12 to execute various information processes. A particular example of the processes executed by the control unit 11 in the present embodiment is hereinafter described. The storage unit 12 includes at least one memory device such as a RAM and stores programs to be executed by the control unit 11 and data to be processed by the programs. The interface unit 13 is a communication interface for receiving information from the object sensors 14. The information processing apparatus 10 is connected for communication to plural object sensors 14 by wireless or wired communication through the interface unit 13.

The object sensor 14 observes a state of the real space to acquire information for specifying the position of each of plural unit elements configuring an object of a processing target (hereinafter referred to as a "subject O"). In the present embodiment, it is assumed that the subject O is a person (user of the information processing apparatus 10). Further, a unit element is an element each of which is obtained by subdividing at least the surface of the subject O by a predetermined criterion and may be a face element in the form of a flat plate or a volume element having a three-dimensional shape. An overall shape of the subject O is represented by a set of such unit elements. In order to reproduce the shape of the subject O, the unit element is sufficiently small with respect to the size of the subject object O and has a relatively simple shape. However, the unit elements are not required to have a fully same shape or a fully same size. In the present embodiment, it is assumed that the unit elements are volume elements (point clouds) having a predetermined shape (for example, a cubic shape).

In particular, in the present embodiment, the object sensor 14 is a distance image sensor, has a measurement range that is a real space including the subject O, and measures, for each of plural unit regions obtained by dividing the measurement range, the distance to an object existing in the unit region. Further, in the present embodiment, plural object sensors 14 are arranged in such a manner as to surround the subject O as depicted in FIG. 2. By integrating information measured by such plural object sensors 14, it is possible to eliminate a blind spot and specify an overall shape of the subject O. It is to be noted that the distance image sensor may measure the distance to the subject O by various methods. For example, the distance image sensor may be a stereo camera that measures the distance to the subject O using a parallax or may be a sensor that measures the distance by a TOF method. As an alternative, the distance image sensor may be a sensor that applies a pattern of infrared rays or the like on the subject O and measures the distance to the subject O on the basis of a size or a distribution of the pattern applied on the surface of the subject O. As another alternative, the object sensor 14 in the present embodiment may include an image sensor targeting visible light and may specify a color of each of the unit elements configuring the surface of the subject O.

Figure 3:
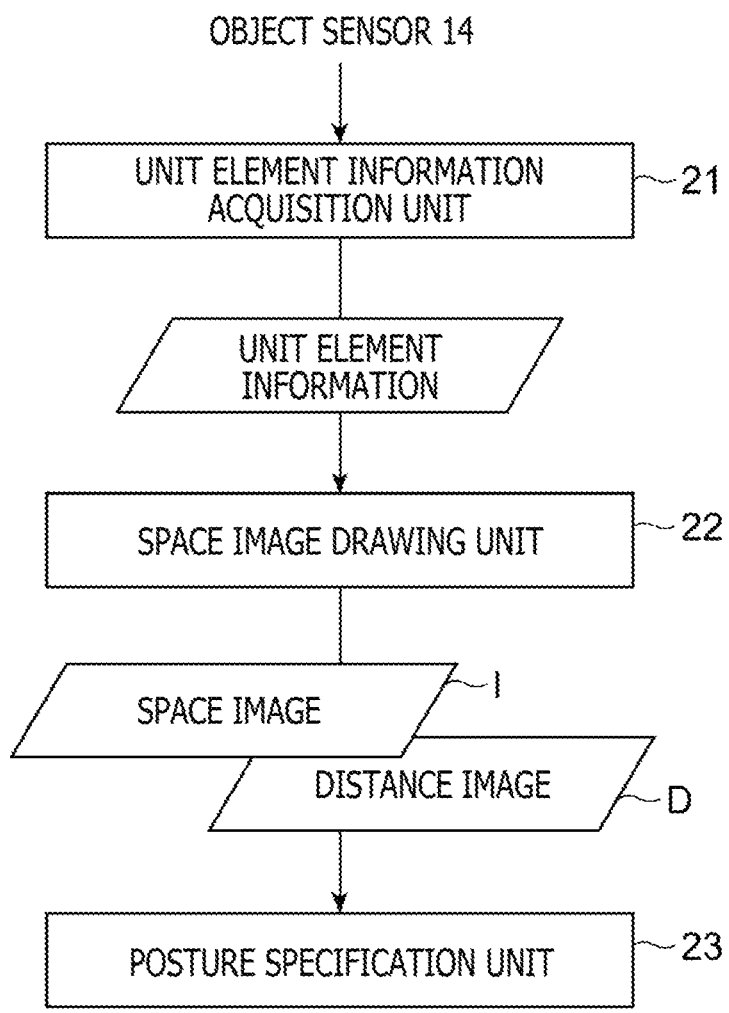
FIG. 3 is a functional block diagram depicting functions of the information processing apparatus according to the embodiment of the present invention.

In the following, functions implemented by the information processing apparatus 10 in the present embodiment are described. As depicted in FIG. 3, the information processing apparatus 10 is configured functionally including a unit element information acquisition unit 21, a space image drawing unit 22, and a posture specification unit 23. The functions can be implemented by execution of a program stored in the storage unit 12, by the control unit 11. Such program may be provided to the information processing apparatus 10 through a communication line such as the Internet or may be stored in and provided as a computer-readable non-transitory information recording medium such as an optical disc.

The unit element information acquisition unit 21 acquires information relating to plural unit elements (hereinafter referred to as "unit element information") configuring the subject O, using a result of the measurement by the object sensor 14. It is assumed that the unit element information includes information indicative of positions and colors of plural unit elements configuring the surface of the subject O. As described hereinabove, in the present embodiment, since the plural object sensors 14 are arranged so as to surround the outer periphery of the user, the appearance of the subject O as viewed from any direction, i.e., from the front, back, left, or right, can be specified by the unit element information.

The space image drawing unit 22 draws a space image I indicative of a state in the inside of the virtual space in which the plural unit elements are arranged, using the unit element information acquired by the unit element information acquisition unit 21. In particular, the space image drawing unit 22 first arranges plural unit elements in the virtual space, using the unit element information. Then, the space image drawing unit 22 decides a drawing condition on the basis of the position information regarding the arranged unit elements. It is assumed that the drawing condition includes at least information regarding a viewpoint position VP and a gaze direction VD in the virtual space when the space image I is to be drawn. Then, the space image drawing unit 22 draws a state in the virtual space in which the unit elements are arranged, in accordance with the decided drawing condition. Such drawing process may be a process similar to a rendering process of an image indicative of a state in a virtual space in which a general virtual object is arranged. Consequently, a two-dimensional space image I that includes an image of a user having a posture and an appearance corresponding to those in the real space is generated.

Here, the viewpoint position VP in the virtual space when the space image drawing unit 22 draws the space image I need not correspond to the arrangement position of any object sensor 14 in the real space and may be a position set optionally on the basis of various conditions as hereinafter described. In other words, by using the unit element information, the space image drawing unit 22 can draw a space image I similar to a captured image that is obtained in the case where the subject O is imaged by a camera from a position at which imaging is not actually performed.

Furthermore, the space image drawing unit 22 generates, together with the space image I, a distance image (depth map) D including information regarding the distance from the viewpoint position VP to the subject O when the space image I is drawn. The distance image D includes information regarding the distance, for each unit region obtained by dividing a viewing field range that is similar to that of the space image I and is determined as a target, to a unit element appearing in the unit region from the viewpoint position VP. In other words, the space image drawing unit 22 can generate a distance image D that can be acquired in the case where a distance image sensor is arranged at a position in the real space corresponding to the viewpoint position VP, although a distance image sensor is not actually arranged at the position, similarly to the space image I.

The posture specification unit 23 specifies the posture of the subject O using the space image I and the distance image D drawn by the space image drawing unit 22. Here, the specification of a posture signifies that a positional relationship of parts configuring the subject O is specified, and may include, in the case where the subject O is a humanoid, specification of the positions of parts such as the face, arms, or legs or specification of a skeleton model including positions of principal joints and so forth.

Figure 4:
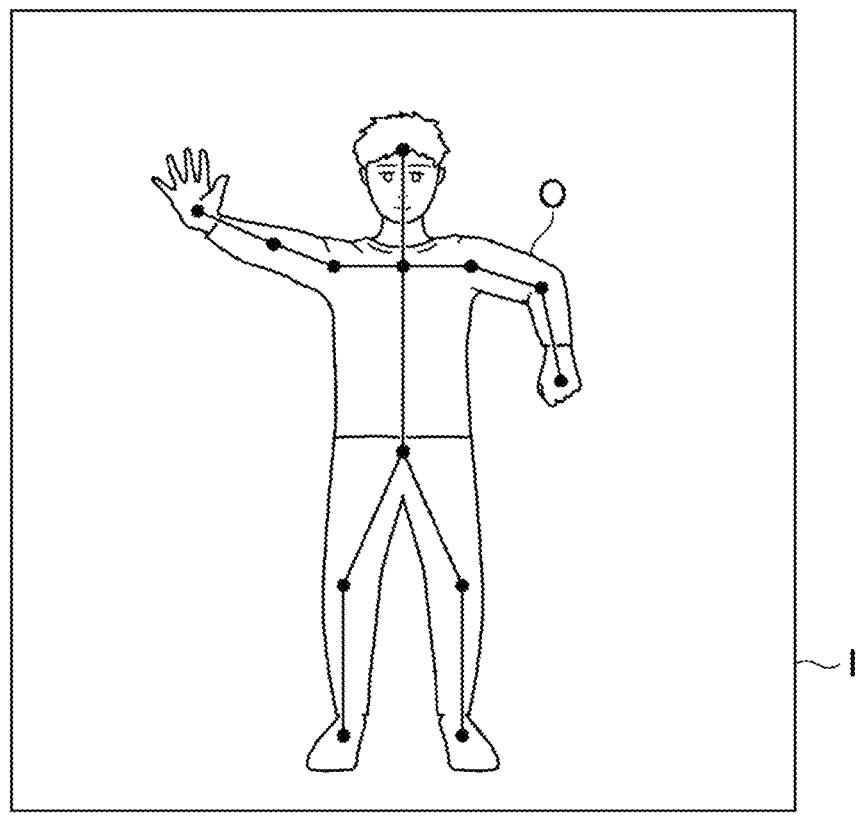
FIG. 4 is a view depicting an example of a skeletal model estimated by the information processing apparatus according to the embodiment of the present invention.

As regards a two-dimensional image such as a photograph image, an estimation engine that can estimate a posture of a person appearing in the image with a relatively high degree of accuracy using machine learning or the like is available. Therefore, the posture specification unit 23 first estimates the posture of the subject O in the space image I by executing a posture estimation process applying such an estimation engine as just mentioned to the two-dimensional space image I drawn by the space image drawing unit 22. A result of such estimation may be a two-dimensional skeleton model including information regarding the positions of the head, waist, elbows, knees, fingers, toes, and so forth (hereinafter referred to as joint positions) of the person in the space image I. FIG. 4 depicts an example of a skeleton model obtained by applying the estimation engine to the space image I in such manner. The estimation engine used here can reduce, because both input data and output data are two-dimensional data, the amount of data to be handled and the processing load in comparison with those in the case where an estimation process by machine learning or the like is applied directly to a set of three-dimensional unit element information.

Furthermore, the posture specification unit 23 specifies the posture of the subject O in the three-dimensional space on the basis of a result of the posture estimation obtained by the estimation engine. In particular, the posture specification unit 23 specifies, using the distance image D generated by the space image drawing unit 22, at which positions the joint positions in the space image I exist in the three-dimensional virtual space. In other words, the position of each joint position in the three-dimensional space is determined by referring to the information regarding the distance from the viewpoint position VP set at a position in the distance image D corresponding to each joint position. In such manner, the posture specification unit 23 can specify a three-dimensional skeleton model of the subject O, using an estimation result of the estimation engine targeting a two-dimensional image.

Information regarding the posture of the subject O specified by the posture specification unit 23 is used to decide the behavior of the subject O and other objects in the virtual space. For example, the space image drawing unit 22 refers to the data regarding the skeleton model specified by the posture specification unit 23 to determine whether or not an interaction between the subject O and any other object arranged in the virtual space occurs. The other object in such case may be a virtual object prepared in advance or an object arranged in the virtual space on the basis of a result of recognizing an object that is other than the subject O and that exists in the real space.

Further, the space image drawing unit 22 may refer to the specification result of the posture specification unit 23 to replace the subject O configured from unit elements with an object prepared in advance. For example, it is assumed that, in the storage unit 12 of the information processing apparatus 10, model data regarding an object representative of an appearance of the user by a polygon mesh or the like is stored in advance. The space image drawing unit 22 arranges an object having a posture changed so as to be the same as an actual posture of the user, in the virtual space, using the posture specified by the posture specification unit 23 and the model data stored in advance. This makes it possible to arrange a high-definition humanoid object having a posture that is the same as an actual posture of the user, in the virtual space.

In the following, several particular examples of a method of deciding a drawing condition when the space image drawing unit 22 draws a space image I are described. As described hereinabove, the space image I drawn by the space image drawing unit 22 is used for posture estimation of the subject O by the estimation engine. Therefore, the space image drawing unit 22 preferably decides a drawing condition such that the accuracy of an estimation result by the estimation engine can be increased.

As a first particular example of the method of deciding a drawing condition, a method of deciding a viewpoint position VP and a gaze direction VD on the basis of a detection result of the object sensor 14 and unit element information is described. The space image drawing unit 22 preferably decides the viewpoint position VP and the gaze direction VD such that the overall subject O is included in the space image I. In particular, the space image drawing unit 22 decides the height from the ground surface, position, and so forth of the viewpoint position VP such that unit elements configuring the subject O fit in the visual field range.

Further, the space image drawing unit 22 preferably arranges the viewpoint position VP at a position facing the front of the subject O. In the case where the subject O is the user, by executing a face recognition process or the like for image data captured by an image sensor included in the object sensor 14, the position and the direction of the face of the user in the real space can be specified. Therefore, by arranging the viewpoint position VP in a direction toward the front of the face specified, the space image drawing unit 22 can draw the space image I when the user is viewed from the front even if the user is not facing the object sensor 14.

Figure 5:
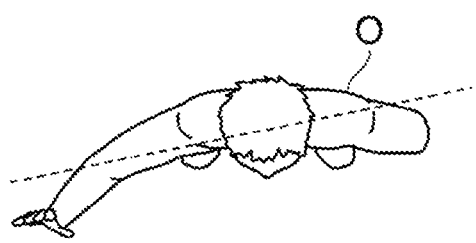
FIG. 5 is a view illustrating an example of a positional relationship between a viewpoint position set by the information processing apparatus according to the embodiment of the present invention and a subject.
Figure 5:

Further, the space image drawing unit 22 may specify the front direction of the subject O by analyzing a distribution of unit elements configuring the subject O. In particular, for example, the space image drawing unit 22 specifies the front direction of the subject O by performing principal component analysis for a distribution of unit elements where the subject O is viewed from above. FIG. 5 is a view depicting a positional relationship between the viewpoint position VP and gaze direction VD and the subject O in such case and depicts a state in which the subject O is viewed from the zenith direction. A broken line overlapping with the subject O in FIG. 5 indicates a body plane decided on the basis of the distribution of unit elements. By setting the gaze direction VD to a direction crossing with the body plane, a space image I where the subject O is viewed from the front can be drawn.

As a second particular example, an example in which unit elements to be arranged in a virtual space are restricted in accordance with a given restriction condition is described. Unit elements detected by the object sensor 14 sometimes include those that configure a different object existing as the background around the subject O. If such unit elements are contained in the space image I, the accuracy in estimation by the estimation engine is sometimes degraded. Therefore, the space image drawing unit 22 may specify unit elements that configure the subject O, on the basis of the distribution of unit elements or arrangement positions of the individual unit elements and arrange only the unit elements specified as configuring the subject O in the virtual space while restricting arrangement of any other unit element. This makes it possible to exclude the background or an obstacle and draw a space image I in which only the subject O appears.

Further, the space image drawing unit 22 may restrict unit elements to be made a target for drawing a space image I, targeting a region in the space. In particular, the space image drawing unit 22 may arrange only unit elements existing in a specific spatial region in the virtual space to draw a space image I. By this, specification of a posture can be performed only in a case where the subject O exists in a noticed region.

Meanwhile, in the case where not the entire subject O but part of the subject O is to be made a target for posture specification, the space image drawing unit 22 may draw a space image I by arranging only unit elements that exist in a region in which a portion to be made a target for posture specification is supposed to exist, in the virtual space. As a particular example, in the case where only the upper body of the user is to be made a target for posture specification, the space image drawing unit 22 may draw a space image I by arranging only unit elements existing above a predetermined height, in the virtual space. Further, in the case where the position of the face of the user is specified by face recognition, a region to be made a target in which unit elements are to be arranged may be decided with reference to the position of the face of the user. Further, the space image drawing unit 22 may restrict, in a specific region, unit elements having a specific color, unit elements configuring a face in which a normal is directed to a specific direction, or like unit elements, as a drawing target or a target excluded from a drawing target.

As a third particular example, an example in which a condition relating to a color or lighting when a space image I is to be drawn is changed is described. For example, in a case in which a predetermined condition is satisfied such as a case in which the brightness of a color a unit element has is excessively dark, the space image drawing unit 22 may execute a correction process for changing the brightness of each color such as to make the brightness of each color lighter or to a gray scale.

Further, when a space image I is to be drawn, the space image drawing unit 22 may decide the number and position of light sources to be set in a virtual space, the color of light, and so forth on the basis of a distribution of the unit elements, an estimation result of the front direction of the subject O, and so forth, similarly to the viewpoint position VP and the gaze direction VD. In particular, for example, the space image drawing unit 22 may draw a space image I by arranging a light source in the virtual space such that light shines from the front of the user. Further, the space image drawing unit 22 may change contents of a shadow appearing in the space image I such as a self-shadow or a cast shadow such that the accuracy in estimation by the estimation engine is increased.

As a fourth particular, an example in which a drawing condition is decided using information obtained by a sensor or the like other than the object sensor 14 is described. For example, the user who is the subject O may wear a tracking device that can detect a change in position or orientation of the user. As such a tracking device, there are known various devices such as a device that includes a motion sensor and can detect a direction of movement or the like of the device itself from a result of detection by the motion sensor. The space image drawing unit 22 can specify the position or the orientation of the body of the user, using a detection result by such a tracking device as just described. Then, according to the specified position and orientation of the body of the user, a viewpoint position VP and a gaze direction VD are set so as to face the front of the user. This makes it possible to draw a space image I where the user is viewed from the front. Further, the space image drawing unit 22 may decide a region in which unit elements are to be arranged, on the basis of a result of detection by such a device as described above and arrange only unit elements existing in the decided regions, in a virtual space.

As a fifth particular example, an example in which plural space images I are drawn from the same unit element information is described. In this example, plural space images I are drawn under drawing conditions different from each other, and estimation of the posture by an estimation engine is performed for each of the plural space images I drawn.

For example, the space image drawing unit 22 sets plural viewpoint positions VP at positions spaced from one another and draws space images I indicative of states where the subject O is viewed from the viewpoint positions VP. The plural viewpoint positions VP set here may be set, for example, to positions spaced by an equal angle from each other with the subject O at the center. Then, the posture specification unit 23 executes a posture specification process for each of the plural space images I drawn, using the estimation engine. Then, the posture specification unit 23 integrates plural results of the posture specification to specify the posture of the subject O. The integration process of the plural results of the posture specification in such case is, for example, a process of calculating representative values of position coordinates individually obtained by the plural results of posture specification to determine position coordinates of the individual indirect positions, for the same joint position.

As a sixth particular example, an example in which the same unit element information is used to draw a space image I multiple times and thereby perform posture specification is described. In this example, the space image drawing unit 22 first decides a first drawing condition by such a method as described above and draws a space image I in accordance with the decided drawing condition. In particular, unlike in the fifth particular example, only one space image I is first drawn. Then, if specification of the posture of the subject O results in success on the basis of the drawn space image I, the space image drawing unit 22 need not newly draw a space image I, and the posture specification process is ended immediately.

On the other hand, in the case where it is determined that the first time posture specification process has a problem, the space image drawing unit 22 changes the drawing condition to one different from the first one and executes a re-drawing process for drawing a second space image I, using the unit element information same as that in the first process. For example, in the case where there is a joint position for which specification has resulted in failure in the first posture specification process, the space image drawing unit 22 performs the re-drawing process. At this time, the space image drawing unit 22 changes the viewpoint position VP and the gaze direction VD to be used when the re-drawing process is to be performed from those used in the first drawing process such that the joint position for which the posture specification process has resulted in failure can be specified easily.

Figure 6:
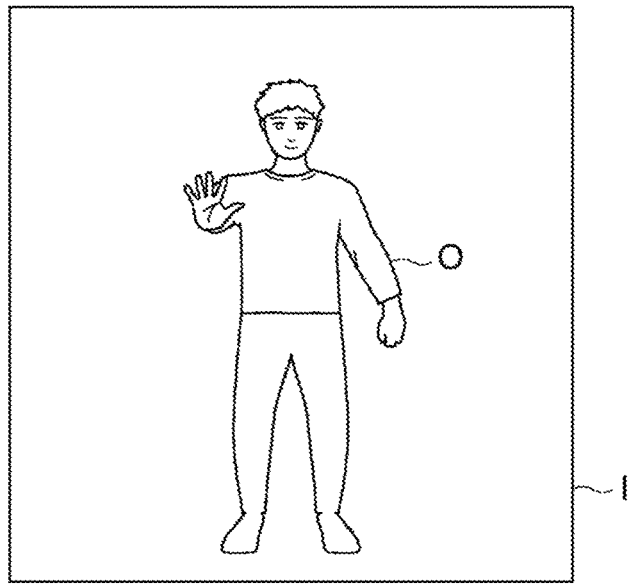
FIG. 6 depicts diagrams illustrating a particular example in which a drawing process and a posture specification process are executed multiple times.
Figure 6:
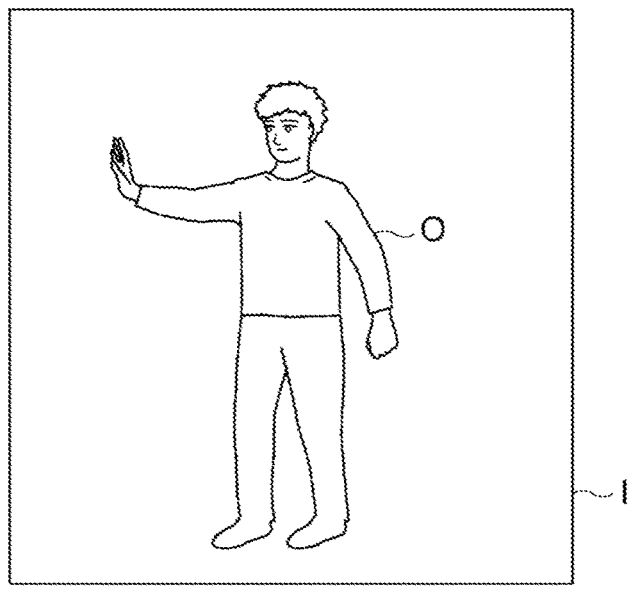
Figure 6:
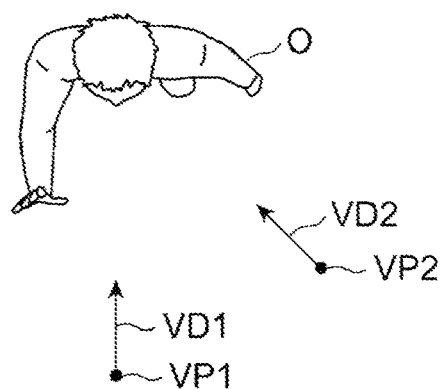

FIG. 6 depicts diagrams illustrating an example of contents of change of a drawing condition described above, and FIG. 6(*a*) depicts a particular example of a space image I drawn first. In this example, it is assumed that, although the viewpoint position VP is set in the direction of the front of the user, since the user is extending the right hand toward the front, the right elbow is hidden, and therefore, the joint position of the right elbow could not be specified in the posture specification process for the space image I of FIG.

6(a). At this time, the space image drawing unit 22 changes the viewpoint position VP and the gaze direction VD from those for the first process to execute a re-drawing process. FIG. 6(b) depicts an example of a second space image I, and FIG. 6(c) depicts a positional relationship of the viewpoint positions VP and the gaze directions VD in the drawing processes for the first and second times. It is to be noted that FIG. 6(c) is a view in which the user is viewed from the zenith direction, and VP1 and VD1 respectively indicate the viewpoint position VP and the gaze direction VD at the time of the drawing process which is executed first while VP2 and VD2 respectively indicate the viewpoint position VP and the gaze direction VD at the time of the re-drawing process which is executed second. In the example of this figure, the viewpoint position VP and the gaze direction VD are rotated by 45 degrees in the counterclockwise direction as viewed in plan in the re-drawing process, and the right elbow can be seen more easily.

Although it is assumed in the foregoing description that a re-drawing process is executed in the case where there exists a joint position for which specification has resulted in failure, the space image drawing unit 22 may execute the re-drawing process in other cases as well. For example, it is assumed that the space image drawing unit 22 executes the re-drawing process in the case where joint positions specified by the first posture specification process include a joint position that is unnatural based on the structure of the human body. In the present embodiment, a joint position in a three-dimensional virtual space is specified using an estimation result by the estimation engine and the distance image D targeting a two-dimensional space image I. Therefore, even in the case where the estimation engine determines that a joint position is not unnatural in the space image I, a case possibly occurs in which a part of the human body exists at an unnatural position that does not match with distance information from the distance image D. In such a case as just described, executing the re-drawing process increases accuracy in posture specification.

It is to be noted that, in the case where such a re-drawing process as described above is executed and the posture specification process is executed again using a space image I obtained as a result of the re-drawing process, the posture specification unit 23 may replace a joint position for which specification has resulted in failure or a joint position decided as unnatural in the first posture specification process, with position information obtained as a result of the second posture specification process. Alternatively, posture specification results obtained by execution of the posture specification process multiple times may be integrated to decide the posture of the subject O, similarly as in the fifth particular example described above.

Further, it is assumed that, when the re-drawing process is to be executed, the space image drawing unit 22 refers to a result of the first posture specification process to decide a new drawing condition. For example, when the first posture specification process is executed, then, as a result of the execution, it can be specified in which direction the face of the user is directed and which direction is the front direction of the body of the user. Therefore, in the case where it is determined that the viewpoint position VP and the gaze direction VD at the time of the first drawing process are displaced by a great amount from the front of the user, the space image drawing unit 22 may decide a viewpoint position VP and a gaze direction VD for a re-drawing process according to the front direction of the user specified by the first posture specification process.

Figure 7:
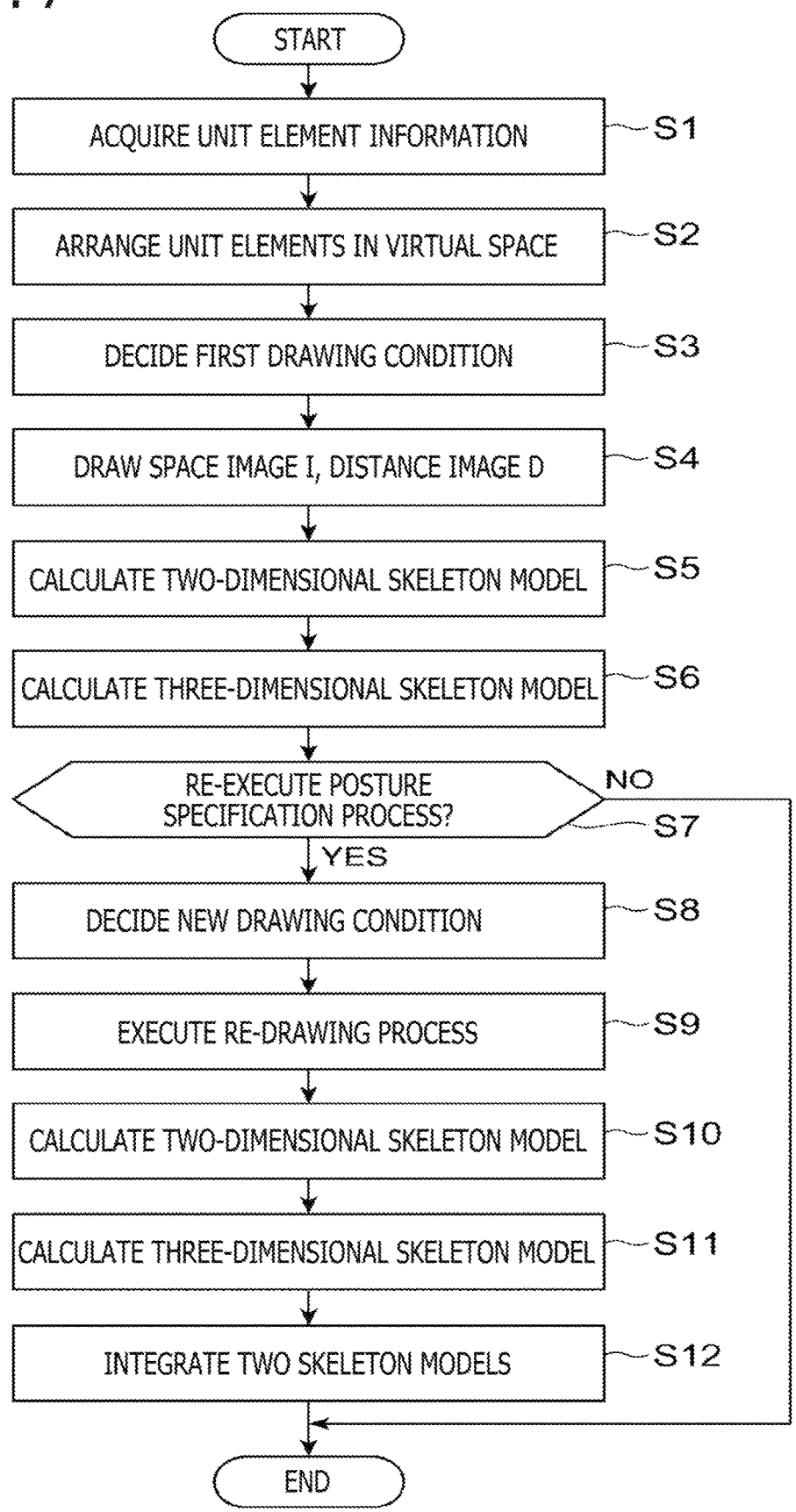
FIG. 7 is a flow chart depicting an example of a flow of processes executed by the information processing apparatus according to the embodiment of the present invention.

Here, an example of a flow of processing executed by the control unit 11 in the case where the re-drawing process is to be executed is described with reference to a flow chart of FIG. 7.

First, the unit element information acquisition unit 21 acquires unit element information necessary to specify the posture of the subject O, using a detection result of the object sensor 14 (S1). Then, the space image drawing unit 22 arranges unit elements configuring the subject O in a virtual space, using the unit element information acquired in S1 (S2). Thereafter, the space image drawing unit 22 decides a first drawing condition (S3) and draws a space image I and a distance image D in accordance with the decided drawing condition (S4).

Next, the posture specification unit 23 applies an estimation engine to the space image I drawn in S4 and calculates a two-dimensional skeletal model as an estimation result (S5). Then, the posture specification unit 23 calculates a three-dimensional skeletal model on the basis of the calculated skeletal model and the distance image D drawn in S4 (S6). Thereafter, the posture specification unit 23 determines whether or not re-execution of the posture specification process is to be performed (S7). In the case where there is a main cause of determination that the accuracy of the skeletal model calculated in S6 is insufficient in that there exists a joint position for which specification has resulted in failure as described above, the posture specification unit 23 determines that re-execution is to be performed. In such case, the space image drawing unit 22 decides a new drawing condition for the re-drawing process on the basis of the information regarding the skeletal image calculated in S6 (S8). Thereafter, the space image drawing unit 22 executes the re-drawing process to draw a new space image I and a new distance image D (S9). Then, the posture specification unit 23 calculates a two-dimensional skeletal model, similarly as in S5 described hereinabove, on the basis of the new space image I obtained by the re-drawing process (S10) and calculates a three-dimensional skeletal image similarly as in S6 (S11). Thereafter, the posture specification unit 23 integrates the three-dimensional skeletal images calculates in S6 and S11 to specify the posture of the subject O (S12).

It is to be noted that, although it is assumed here that the re-drawing process is to be performed only once, in the case where it is determined that there is still a problem in the skeletal model obtained as a result of the second posture specification process, a drawing process and a posture specification process may be executed for the third and subsequent times.

Further, the posture specification unit 23 may use not only the space image I drawn by the space image drawing unit 22 but also a captured image directly captured by the image sensor, in the posture specification process. For example, the posture specification unit 23 may execute the posture specification process for both the captured image and the space image I and integrate the plural skeleton models obtained as a result of the posture specification process to specify the posture of the subject O. Alternatively, in the case where a predetermined condition is satisfied such as a case where the posture specification process is first executed using the captured image and specification of some joint positions results in failure, the posture specification process may be executed using the space image I drawn by the space image drawing unit 22.

Further, the space image drawing unit 22 may decide a drawing condition by optionally combining the plural particular examples described above. For example, the space image drawing unit 22 may decide a viewpoint position VP and a gaze direction VD using both a result of the main component analysis and a result of measurement by the tracking device. Further, after plural space images I are drawn in accordance with drawing conditions decided on the basis of the results, results obtained by executing the posture specification process using the space images I may be integrated.

With the information processing apparatus 10 according to the present embodiment described above, by executing a posture specification process for a space image I drawn using unit element information, the posture of a subject O in a three-dimensional space can be specified using an estimation engine targeting a two-dimensional image. Further, by optionally deciding a drawing condition, it is possible to draw a space image I suitable for posture specification such as an image from a viewpoint from which imaging is unrealistic or an image from which peripheral objects are excluded.

It is to be noted that the embodiment of the present invention is not limited to that described above. For example, while the unit element in the foregoing description is assumed to be a volume element having a three-dimensional shape, the unit element may otherwise be a planar face element such as a polygon mesh. Further, although the foregoing description is given assuming that the subject O is a person, the subject object O may otherwise be an object having a shape simulating a person such as a doll or a substance having a plurality of movable parts such as an animal as a target to specify the posture.

Further, in the foregoing description, it is assumed that unit element information is acquired on a real time basis using a result of detection by the object sensor 14 targeting a subject O actually existing. This makes it possible to specify the current posture of a user or the like on a real time basis and reproduce the movement of the user or the like in a virtual space. However, the embodiment of the present invention is not limited to this, and unit element information recorded in the past may be acquired to execute the posture specification process. Further, information regarding unit elements such as a polygon mesh representative of an object in a virtual space may be acquired to execute the posture specification process.

REFERENCE SIGNS LIST

1 Information processing system, 10 Information processing apparatus, 11 Control unit, 12 Storage unit, 13 Interface unit, 14 Object sensor, 21 Unit element information acquisition unit, 22 Space image drawing unit, 23 Posture specification unit

The invention claimed is:

1. An information processing apparatus, comprising:
a unit element information acquisition unit configured to acquire, in regard to a subject in a three-dimensional space, unit element information including information regarding a position, in the space, of each of plural unit elements configuring the subject;
a space image drawing unit configured to draw a space image indicative of a state of a virtual space in which the plural unit elements are arranged, using the unit element information; and
a posture specification unit configured to specify a posture of the subject in the three-dimensional space on a basis of a result obtained by executing a posture estimation process targeting a two-dimensional image for the drawn space image,
wherein the space image drawing unit draws the space image in accordance with a drawing condition decided on a basis of the unit element information, and
wherein the space image drawing unit draws the space image where the plural unit elements are viewed from a viewpoint position and a gaze direction decided on the basis of the unit element information.

2. The information processing apparatus according to claim 1, wherein
the subject includes a person, and
the space image drawing unit places the viewpoint position in a direction of a front of the person.

3. The information processing apparatus according to claim 2, wherein
the space image drawing unit specifies the direction of the front of the person by specifying a position of a face of the person.

4. The information processing apparatus according to claim 2, wherein
the space image drawing unit specifies the direction of the front of the person on a basis of a distribution of the plural unit elements.

5. The information processing apparatus according to claim 1, wherein
the space image drawing unit draws plural space images in accordance with plural drawing conditions, using same unit element information, and
the posture specification unit specifies the posture of the subject on a basis of the plural space images.

6. The information processing apparatus according to claim 1, wherein,
after the posture specification unit specifies the posture of the subject using the space image drawn first, the space image drawing unit re-draws, according to a result of the specification, the space image in accordance with a drawing condition different from the first drawing condition, and
the posture specification unit specifies the posture of the subject on a basis of the re-drawn space image.

7. The information processing apparatus according to claim 1, wherein
the drawing condition includes a restriction condition for restricting specific elements to be unit elements to be arranged in the virtual space, and
the space image drawing unit draws a space image indicative of a state of a virtual space in which some of the unit elements specified in accordance with the drawing conditions are arranged.

8. The information processing apparatus according to claim 1, wherein
the drawing condition includes a condition relating to a light source to be placed in the virtual space, and
the space image drawing unit draws a space image indicative of a state of the virtual space in which the light source is placed in accordance with the drawing condition.

9. The information processing apparatus according to claim 1, wherein
the space image drawing unit decides the drawing condition using a result of detection by a sensor capable of detecting a position of the subject.

10. An information processing method, comprising:
acquiring, in regard to a subject in a three-dimensional space, unit element information including information regarding a position, in the space, of each of plural unit elements configuring the subject;

drawing a space image indicative of a state of a virtual space in which the plural unit elements are arranged using the unit element information;

specifying a posture of the subject in the three-dimensional space on a basis of a result obtained by executing a posture estimation process targeting a two-dimensional image for the drawn space image, wherein the space image is drawn in accordance with a drawing condition decided on a basis of the unit element information; and wherein the space image is drawn where the plural unit elements are viewed from a viewpoint position and a gaze direction decided on the basis of the unit element information.

11. A non-transitory computer readable medium having stored thereon a program for a computer, comprising:

by a unit element information acquisition unit, acquiring, in regard to a subject in a three-dimensional space, unit element information including information regarding a position, in the space, of each of plural unit elements configuring the subject;

by a space image drawing unit, drawing a space image indicative of a state of a virtual space in which the plural unit elements are arranged using the unit element information; and by a posture specification unit, specifying a posture of the subject in the three-dimensional space on a basis of a result obtained by executing a posture estimation process targeting a two-dimensional image for the drawn space image, wherein the space image drawing unit draws the space image in accordance with a drawing condition decided on a basis of the unit element information, and wherein the space image drawing unit draws the space image where the plural unit elements are viewed from a viewpoint position and a gaze direction decided on the basis of the unit element information.

* * * * *